(12) United States Patent
Ramaswamy et al.

(10) Patent No.: US 8,994,500 B2
(45) Date of Patent: Mar. 31, 2015

(54) EVENT MANAGEMENT SYSTEM

(75) Inventors: Satyanarayanan Ramaswamy, Cupertino, CA (US); Srinivasan Pulipakkam, Sunnyvale, CA (US); Jose Paul Puthenkulam, Beaverton, OR (US)

(73) Assignee: Tata Consultancy Services, Mumbai (IN)

( * ) Notice: Subject to any disclaimer, the term of this patent is extended or adjusted under 35 U.S.C. 154(b) by 207 days.

(21) Appl. No.: 13/364,207

(22) Filed: Feb. 1, 2012

(65) Prior Publication Data

US 2013/0194073 A1 Aug. 1, 2013

(51) Int. Cl.
*G08B 5/22* (2006.01)
*H04W 4/02* (2009.01)

(52) U.S. Cl.
CPC .................................... *H04W 4/02* (2013.01)
USPC ......................................................... 340/8.1

(58) Field of Classification Search
USPC ............. 340/8.1, 10.3, 10.4, 5.22; 455/414.2, 455/404.2
See application file for complete search history.

(56) References Cited

U.S. PATENT DOCUMENTS

| 7,228,139 B1* | 6/2007 | Wortham .................... 455/456.1 |
| 7,683,937 B1* | 3/2010 | Blumenfeld ............. 348/211.11 |
| 7,694,885 B1* | 4/2010 | Bourdev ........................ 235/487 |
| 2010/0091687 A1* | 4/2010 | Beers et al. .................... 370/260 |

* cited by examiner

*Primary Examiner* — Vernal Brown
(74) *Attorney, Agent, or Firm* — Lee & Hayes, PLLC (57) ABSTRACT

Systems and methods for event management are described. In one embodiment of the present subject matter, an audio beacon indicative of a location code associated with a location is received from a user device by an event management system. The event management system may then identify the location and an event associated with the location, based on a current time and an event schedule. Event content related to the identified event may then be provided to the user device in real time. In another embodiment, visual tag data pertaining to color coded tags embedded in one or more objects in the location of the event may be received and information content related to the object may be provided to the user device, based on the event schedule.

16 Claims, 4 Drawing Sheets

EVENT MANAGEMENT SYSTEM

TECHNICAL FIELD

The present subject matter relates to event management and, in particular, relates to an event management system using mobile technology.

BACKGROUND

Various types of events, such as business events, corporate events, conferences, trade shows, contest events, technology fairs, fun fairs, etc., are held in a large number around the globe. Such events may have people participating in large numbers. For example, business events and corporate events may have various speakers and delegates speaking on various technologies emerging in the market. In many such events, products and merchandise may be exhibited for selling and displaying to the participants of the event.

Management of such events, generally referred to as event management, relates to managing various aspects of an event. As described, a large number of people may be participating in an event. Hence, planning for budgets, logistics, participation details, facilities, and other event related aspects become essential for effective management of a particular event. One factor that may largely influence the success of an event pertains to making information relating to the event available to target audience and participants of the event.

In the present time, mobile technology is widely used for management of events. Mobile communication techniques may be used, among other things, for providing the target audience and participants with information regarding the event.

SUMMARY

This summary is provided to introduce concepts related to a system for an event management and the concepts are further described below in the detailed description. This summary is neither intended to identify essential features of the claimed subject matter nor is it intended for use in determining or limiting the scope of the claimed subject matter.

In an embodiment of the present subject matter, method(s) and system(s) for event management are described. The method comprises, receiving, from a user device, an audio beacon indicative of a location code associated with a location. The method may further comprise identifying the location and an event in the identified location. In an implementation, the event may be identified based on an event schedule. In an embodiment, event content related to the identified event may be provided, to the user device, in real time.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to method(s) and system(s) for event management.

With the advent of mobile technology, conventional event management techniques have graduated from providing hand outs, such as brochures and pamphlets having information relating to an event to participants, to making the same information available to the participants through a website. The information relating to an event may be available on a website and may be retrieved there from by the participants. In a similar approach the information relating to an event may be conveyed to the participants by sending emails, Short Messaging service (SMS), etc., on a mobile device of the participants.

The conventional approaches do not provide real time information regarding the various session of the event. The participants seeking additional information regarding an ongoing session in the event may gather the same only after searching for such information either on the internet or by manually reading brochures or pamphlets.

Additionally, in cases where several concurrent events are organized in a venue, a participant may need real time information relating to each of the concurrent events. Conventional event management systems may not be of assistance in such cases. For example, in a technology fair, several concurrent sessions may be conducted simultaneously in a particular venue. For example, several talks, discussion and conferences may be going on in different parts of the venue. A participant may enter a location of the venue where a conference is going on. The participant may not be aware of aspects like the topic of the conference, name and designation of the speaker, duration of the conference, and the like. Thus, information regarding the mentioned aspects may be needed by the user in real time in order to actively participate in the conference. Further, additional information, like presentations, information booklets, schedules, etc., may also be needed by the participant to participate in the conference.

Recent event management techniques involve providing a floor map of the event location to participants of an event, illustrating in real time, the different parts of the locations in which different sessions of the event may be ongoing. The floor map may be generated based on location sensing techniques like Global Positioning System (GPS), wireless signal triangulation, and the like. The location sensing techniques used in the conventional event management systems may have deployment problems. Further, the location sensing techniques may not function properly in large indoors.

The conventional event management systems cater only to participants who have prior awareness of an event and proactively search for details relating to the event of his interest. Conventional event management systems may not provide dynamically the detections of ongoing events in a location where a user may be present.

Moreover, once a participant is in the location of the event, he may seek additional information regarding things or objects he may be interested to see in the vicinity. Referring to the previous example for illustration, a participant may see a poster regarding advertisement of a product that may be displayed in the location of the conference. The participant may then require contextual information regarding details, specifications, manufacturers, price and the like for the product in a real time without the need to search for such external information manually.

Described herein are method(s) and system(s) for the event management for dynamic location based event detection. The present subject matter, according to an embodiment, allows a user of a mobile device to dynamically detect an event based on a current time and location.

In an implementation, a user device may receive audio beacons from a plurality of beacon devices that may be installed in a location of a particular event. In an implementation, the audio beacon may be transmitted to the user device using an upper audio band on an acoustic communication network. The audio beacons may be understood as upper audio band signals that have encoded a location code associated to the location of the event. The audio band signals may be captured by the microphone of the mobile device. In one implementation, the location code may then be communicated to an event management server in order to identify the location.

Based on the identified location and the current time, the event management server may determine an event ongoing in the identified location. In one implementation, the event management server may determine an event scheduled to occur at a future date or an event that may have been occurred, say, in the recent past at the identified location. In one embodiment, event management server may be preconfigured with an event schedule of the identified location to enable determination of the ongoing event. For example, the event schedule may relate to an ongoing event, such as a tech fest that may be ongoing at the current time or may relate to a future event, such as a book fair that may be scheduled to occur in a couple of days. In one example, the event schedule of a past event, such as an international seminar that may been hosted at the identified location, may also be determined.

In another embodiment of the present subject matter, visual tag data pertaining to color coded visual tags embedded in one or more objects in the identified location may be received by the user device. In an implementation, the user may send the visual tag data to the event management system in order to obtain information content related to the object. The visual tag data may be captured by a camera device of the user device. In an example, the information content may be displayed on a display of the user device. The information content may include specifications, brand, price and the like of the object.

In an implementation, the audio beacon received by the user device may facilitate accurate sensing of the location. Further, the identification of the event associated with the location may be performed in real time. The event content relating to the identified event may thus be provided to the user as soon as the user enters the location of the event. In another implementation, as the user views the objects in the location, information content may be displayed on the display of the user device hence, increasing interactivity of the user in the event.

The above methods and systems are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

While aspects of described systems and methods for event management can be implemented in any number of different computing devices, environments, and/or configurations, the embodiments are described in the context of the following exemplary system(s) and method(s).

Figure 1:
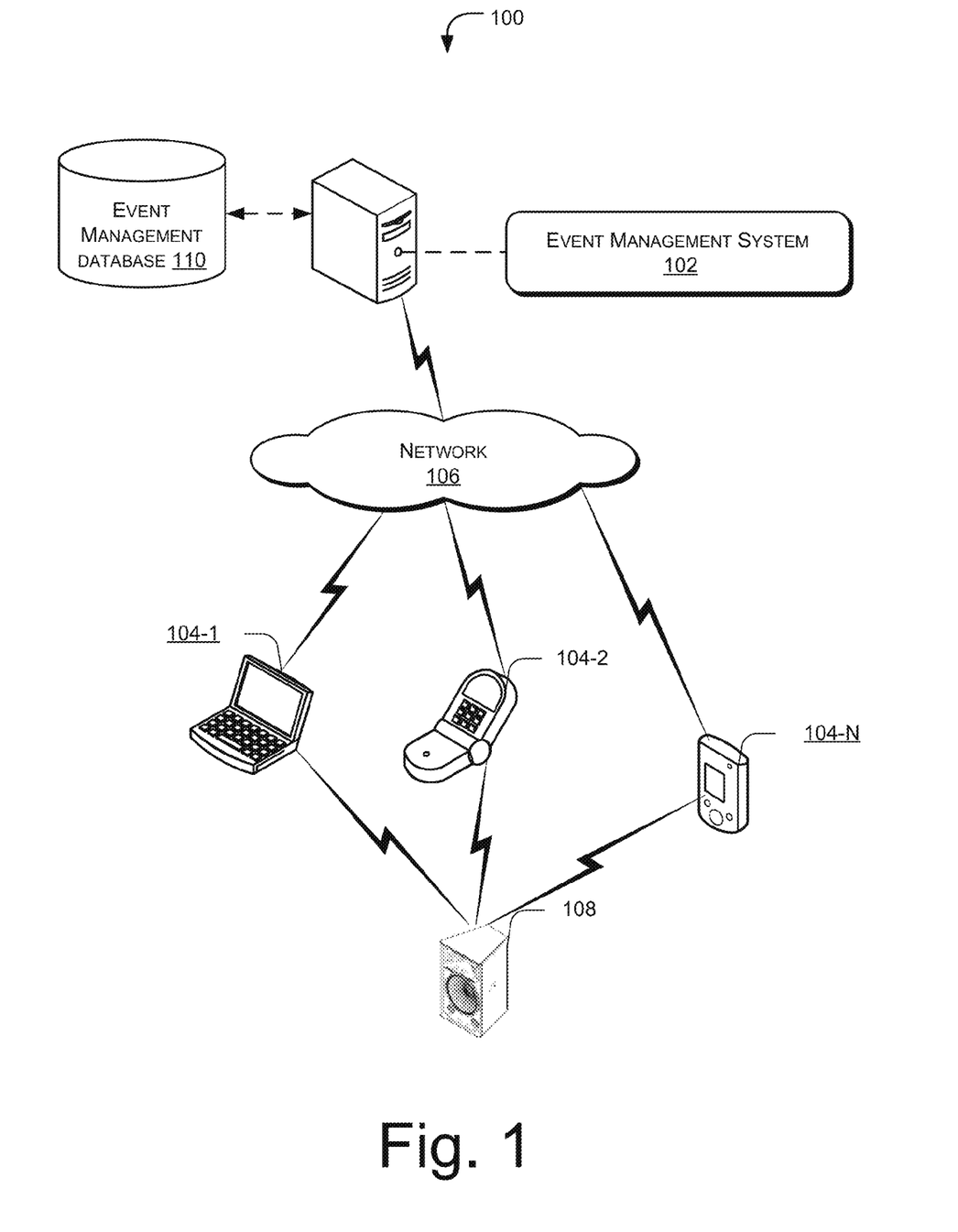
FIG. 1 illustrates a network environment implementing a event management system, according to an implementation of the present subject matter.

FIG. 1 illustrates a network environment 100 implementing an event management system 102, according to an embodiment of the present subject matter. The network environment 100 includes at least one event management system 102 connected to one or more user devices 104-1, 104-2, . . . , 104-N via a network 106. For the purpose of explanation and clarity, the user devices 104-1, 104-2 . . . 104-N, are hereinafter collectively referred to as user devices 104 and individually referred to user device 104. The network environment 100 further includes a beacon device 108.

The beacon device 108 may be a wired or wireless communication device, such as a transmitter configured to transmit signals in the upper audio band. Examples of such beacon devices 108 include but are not limited to loud speakers, music players, speakers or woofers, and radios antennas, and other devices capable of transmitting acoustic signals.

The beacon device 108 is communicatively coupled to the user devices 104 over an acoustic channel. The user devices 104 may be any device incorporating a receiver, such as a microphone, capable of receiving such acoustic signals. Examples of such user devices 104 include but are not limited to hand-held devices, laptops, tablets or other portable computers, smart phones, mobile phones, personal digital assistants (PDAs), and notebooks.

In an implementation, the beacon device 108 transmits audio beacons to the user devices 104. The audio beacons may be digitally encoded with a location code indicative of a location in which the beacon device 108 is installed. In one embodiment, a predefined location code is associated with each beacon device 108 for example by an organizer of the event. The beacon device 108 transmits the audio beacons to the user device 104 via an acoustic channel comprising audio frequencies. In an example, the frequency of the upper band may lie between 16 KHz to 20 KHz. As would be appreciated by a person skilled in the art, the audio beacon is inaudible to human ears but may be identified by the microphone of the user devices 104. The location code, for example, may be encoded on the audio beacon using conventional Sub-Band Coding (SBC) techniques.

Upon receiving the audio beacons through the microphone, the user devices 108 may be configured to decode the location code and further transmit the same to the event management system 102, over the network 106. For example, a user device 104, such as a mobile phone may receive an audio beacon comprising a location code. The audio beacon, which is an acoustic signal, is converted, for example, into a GSM based signal by the user device 104 and transmitted over a GSM based cellular communication network to the event management system 102. It will be appreciated that a user device, such as the user device 104 in the present example, operates in a conventional manner in transmitting over cellular communication network. It will also be appreciated that the above example is only for illustration purposes, various other means of communication such as Internet Protocol (IP) based communication are also possible between the user devices 104 and the event management system 102.

Accordingly, the network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and the like. The network 106 may either be a dedicated network or a shared network, which represents an association of the different types of networks that use a variety of protocols, for example, Hypertext Transfer Protocol (HTTP), or secure HTTPS, Transmission Control Protocol/Internet Protocol (TCP/IP), etc., to communicate with each other. Further, the network 106 may include network devices, such as network switches, hubs, and routers for providing a link between the event management system 102 and the user devices 104. The network devices within the network 106 may interact with the event management system 102 and the user device 104 through the communication links.

The user devices 104 are configured to convert the audio beacon into a signal that may be communicated to the event management system 102 over the network 106 in accordance with the protocol of the network 106 and the event management system 102, as will be apparent to one skilled in the art.

The event management system 102 may be implemented as any of a variety of conventional computing, for example, servers, a desktop PC, a notebook, a workstation, a mainframe computer, an Internet appliance hand-held devices, laptops, tablets or other portable computers, smart phones, mobile phones, and personal digital assistants (PDAs).

The location code transmitted by the user devices 104 is received by the event management system 102 and based on the location code the event management system 102 identifies the location associated with the location code. In an implementation, a plurality of location codes, each corresponding to a location where a particular beacon device 108 is installed, may be stored in an event management database 110 associated with the event management system 102, for identification of the location based on the location code received by the user device 104. As apparent, the location associated with a location code received from a user device, such as a user device 104-2 is the location of the user device 104-2 and may change in real time each time the user of the user device 104-2 moves. To determine a current location of the user of the user device 104-2, each time the user changes his location, a location code associated with the current location may be received from a beacon device 108 installed in the current location and may be provided to the event management system 102.

Based on the identified location, event management system 102, determines an event ongoing in the location. The event management database 110 includes event schedules comprising details of various events scheduled to take place in each of the location having a beacon device 108 installed. The event management database 110 may store a plurality of event content associated with the events. The event content may include name, theme, duration, details of participants, and the like for the event. The event management database 110, in one embodiment, may be integrated within the event management system 102. Further, in various other embodiments, the event management database 110 may be located in a remote location coupled to the event management system 102 through the network 106.

Further, the event management database 110 may be updated either periodically or as and when a change in the event schedules occurs. In one embodiment, a user, such as an event organizer may use a user device, such as user device 104-3 to provide an event schedule update indicative of a change or update in any of the events scheduled to take place in the locations having a beacon device 108 installed.

The event management database 110 may further include the event content, such as presentations, reports, memos, and the like for the event. For example, the event scheduled to take place in a location where a user device, such as user device 104-3 is located may be a conference. The event content may include the name and theme of the conference. Further, the details of the speaker may also be included. In one example, the event content may include presentations, for example, a document that the speaker may be presenting in the conference.

The event content may be provided to the user devices 104 in the identified location. In one embodiment, all the event content associated with the event ongoing in the identified location may be provide. In another embodiment, the event content, such as name and theme of the event may be provided and additional event content, such as presentations, and reports that may be available as documents may be provided upon being requested by the respective users of the user devices 104.

Thus the users of the user devices 104 may receive real time information regarding an event in the location of their presence. For example, a user having user device 104-5 may enter a venue where several conferences may be going on simultaneously in multiple conference rooms. The organizer of the event may install a beacon device, such as the beacon device 108, in each conference room such that as the user moves from one conference room to the other, the user device 104-5 may receive an audio beacon encoded with location code of the present conference room. Based on the identification of the location code, the user may accordingly receive updated event content related to the conference going on in the conference room where the user presently is. Further, such an updated event content is provided to the user in real time.

In one embodiment, users may be provided with information not only relating to the event ongoing in an identified location but also objects that may be present in the location or in the vicinity of the location. For the purpose, in one embodiment, visual tags may be incorporated on such objects. The visual tag, in an example, may be understood as color coded visual identifiers that may be embedded in an object to allow identification of the object. In an implementation, the visual tags may be viewed or captured by a camera device of the user device 104. The user devices may be configured to communicate visual tag data associated with a visual tag being viewed or captured by a user to the event management system 102, for example, over the network 106.

In one embodiment, the event management system 102 may receive visual tag data associated with the visual tag, provided on an object, from a user device 104-6. The event management database 110, in an implementation, may include pre-stored information content relating to each visual tag that may, for example, be incorporated by an event organizer in one or more objects in the identified location. The visual tag data received by the event management system 102 enables identification of the object. Based on the identification, pre-stored information content pertaining to the object may be provided to the user device 104-6.

Examples of information content include specifications, manufacturers, price and the like for the object. Further, information content may be displayed on the display of the user device 104 in the form of a Universal Resource Locator (URL) associated with the identified object.

Thus, the event management system 102 provides the advantage of identifying an object and receiving contextual information about the object in real time. In an example, when the user walks through the location of the event and views an object for display through a camera device of the user device 104-7, the event management system 102 provides, on the display of the user device 104-7 information content related to the object. The information content may be provided to the user in real time, i.e. simultaneously while the user is viewing the object through the camera device. Such a provision may allow an opportunity for an organizer to advertize various products. Further, in an implementation, the information content may be based on an event schedule of the event.

Figure 2:
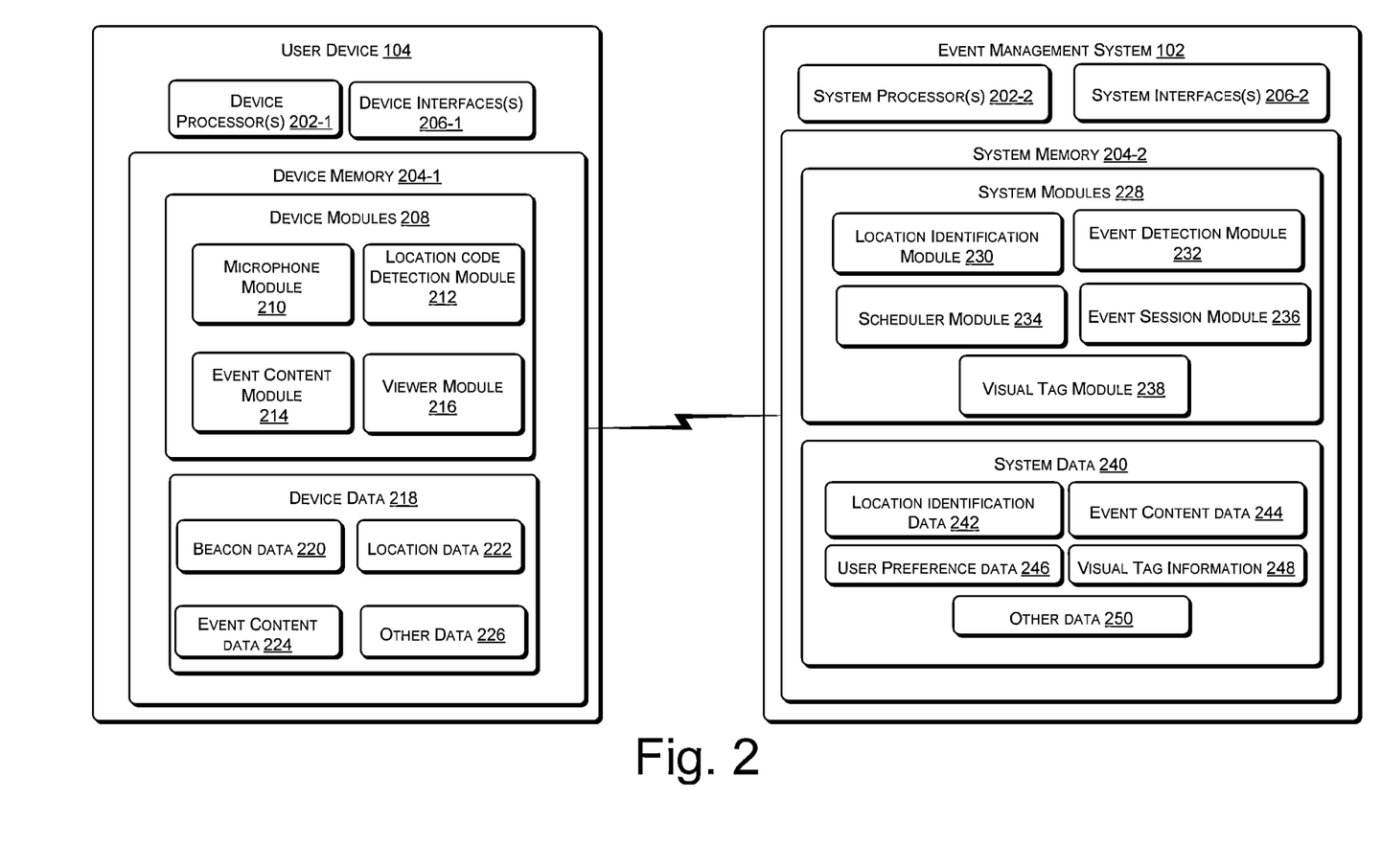
FIG. 2 illustrates a event management system and a user device, according to an implementation of the present subject matter.

FIG. 2 illustrates the event management system 102 and a user device, such as user device 104 according to an embodiment of the present subject matter to elaborate the details of the operation of the event management system 102.

The event management system 102 and the user device 104 as discussed previously may be implemented as various types of computing systems and or communication devices. In one implementation, the event management system 102 and the user device 104 include a device processor 202-1 and a system processor 202-2, respectively. The device processor 202-1 and the system processor 202-2 may be collectively referred to as processor 202.

The processors 202 may be implemented as one or more microprocessors, microcomputers, microcontrollers, digital signal processors, central processing units, state machines, logic circuitries, and/or any devices that manipulate signals based on operational instructions. Among other capabilities, the processor(s) are configured to fetch and execute computer-readable instructions stored in the memory.

The functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The event management system 102 and the user device 104 may further include one or more memory components, referred to as a device memory 204-1 and a system memory 204-2, coupled to the device processor 202-1 and the system processor 202-2, respectively. The device memory 204-1 and the system memory 204-2 are collectively referred to memory 204. The memory can include any computer-readable medium known in the art including, for example, volatile memory (e.g., RAM), and/or non-volatile memory (e.g., EPROM, flash memory, etc).

Also, the event management system 102 and the user device 104 include a device interface 206-1 and a system interface 206-2, respectively, which is collectively referred to as interfaces 206. The interface 206 may include a variety of software and hardware interfaces allowing the event management system 102 and the user device 104 to interact with each other and with the several computing devices and/or network entities. Further, the interface(s) may enable the event management system 102 and the user device 104 to communicate with other communication and computing devices, such as web servers and external repositories. The interface(s) 206 can facilitate multiple communications within a wide variety of networks and protocol types, including wired networks, for example LAN, cable, etc., and wireless networks such as WLAN, cellular, or satellite based.

In one embodiment the device memory 204-1 includes device modules 208 comprising a microphone module 210, a location code detection module 212, an event content module 214, and a viewer module 216. Further, the device memory 204-1 includes device data 218 that serves, in addition to other things, as a repository for storing data fetched, processed, received and generated by one or more of the device modules 208. The device data 218 includes, for example, beacon data 220, location data 222, event content data 224 and other data 226.

Similarly, the system memory 204-2 includes system modules 228 including a location identification module 230, an event detection module 232, a scheduler module 234, an event session module 236 and a visual tag module 238. Additionally, the system memory 204-2 includes system data 240 that serves, amongst other things, as a repository for storing data fetched, processed, received and generated by one or more of the system modules 228. The system data 240 includes, for example, location identification data 242, event content data 244, user preference data 246, visual tag information 248 and other data 250.

In one embodiment, the user device 104, receives an audio beacon from a beacon device 108 in the location of an event. The audio beacon may be received, through a microphone device (not shown in figure) of the user device 104. Further, the audio beacon, as previously described, may be understood as an upper band signal of an acoustic communication network. For example, consider a scenario where the user enters the location of the event. As soon as the user enters, the microphone device of the user device 104 may capture the audio beacon through the beacon device 108. The audio beacon captured by the microphone device may then be received by the microphone module 210.

In one embodiment, the audio beacon captured by the microphone device may be stored in the device data 218 as beacon data 220. Further, the audio beacon captured by the microphone device may then be processed by the microphone module 210 to decode the location code associated therewith. In one example, the processing comprises encoding the location code in a signal capable of being transmitted over the network 106. In said embodiment, the location may be identified by communicating the signal encoded with the location code to the event management system 102 over the network 106. The location code is in turn received by the location identification module 230 of the event management system 102. The location identification module 230 may identify the location associated with the location code by sending a query to the event management database 110. In one example, the event management system 102 may stored, in its system data 240, location identification data 242. The location identification data 242 may be, for example, a look up table enlisting all the location codes and their corresponding locations. The event management system 102 may identify the location using the location identification data 242.

In one embodiment, the audio beacon captured by the microphone device may be used to identify the location associated with the location code by comparing the location code to a plurality of location codes stored in a data repository. In an implementation, the data repository may be internal to the user device 104. The data repository in the user device 104 comprising the plurality of location codes may be referred to as location data 222. In said embodiment, the audio beacon is received by the user device 104; the location code detection module 212 may be triggered. The location code detection module 212 may detect the encoded location code and decode the location code from the audio beacon. The decoded location code may then be utilized to identify the location associated with the location code based on the above mentioned comparison.

In an embodiment of the present subject matter, after the location associated with the location code is identified, the event management system 102 may identify the event associated with the identified location. The identification of the event may be done, in an implementation, by the event detection module 232 of the event management system 102. In one embodiment, the identification of the event is based on event schedules. Further, the event schedules may be obtained from the scheduler module 234. The event schedule, as described previously, are information relating to events scheduled to be organized in certain locations that have beacon devices 108 installed. The event schedules are updated in a timely manner. In one embodiment, the scheduler module 234 of the event management system 102, maintains and updates the event schedules. In one example, the event may be identified by the event detection module 232 in accordance with the current time and the event schedules maintained by the scheduler module 234 and may be indicated to the user device 104. In an implementation, the current time may be taken into consideration for providing event content based on the event schedules. In another implementation, event content related to an event scheduled to occur at a future instance may also be provided. In an example, a user may be indicated that the location, where the user is presently located, is a venue for a book fair scheduled for the next day.

For the indication, the event content associated with the identified event, for example, the duration of the event, different sessions, name of the speakers, number of participants, and the like for the event may be provided to the user device 104. The event content may also include, for example, presentations, seminar reports, and the like of the event. Referring to the previous example, when the user enters the location of the event, event content may be displayed to the display of the user device 104 in real time, thus facilitating the user to dynamically detect the event as well as gain contextual information of the event at the same time, without the need for manual searching of the event content.

In an implementation, the event content may be provided by the event session module 236 of the event management system 102 to the event content module 214 of the user device 104. In an implementation event content may be stored in the event management system 102 as event content data 244. The scheduler module 234 may be configured to search the event content data 244 based on the identified event and may provide the same to the event session module 236 for transmitting the event content to the event content module 214. The event content when received by the user device 104 may be saved as event content data 224.

In an example, the event session module 236 may receive user preference pertaining to a plurality of users. The user preference may be understood as information relating to preference of format, layout etc in which a user wishes to receive the event content. The user preference may be stored in the event management system 102 as user preference data 246. The event session module 236 may be configured to provide event content based on the user preference data 246.

In an embodiment of the present subject matter, visual tag data pertaining to color coded visual tags embedded in one or more objects in the location of the event may be captured. In an implementation, the visual tag data may be captured by a camera device of the user device 104. Further, the visual tag data may be obtained by the viewer module 216 of the user device 104. For example, when the user views a poster displayed in the location of the event through the camera device, visual tag data may be captured by the viewer module 216 of the user device 104. The visual tag data may be indicative of color coded tags embedded in the poster. The visual tag data may then be sent to the event management system 102 to obtain information content related to the poster. The visual tag data, in an implementation, may be received by the visual tag module 238.

At the event management system 102, when visual tag data is received by the visual tag module 238, the visual tag module 238 identifies the object. In one embodiment, to enable the identification of objects, the event management system 102 includes in the system data 240, pre-stored data relating all visual tags associated with objects in the location of the event. The pre-stored data is referred to as visual tag information 248.

Further, upon identification of the object, visual tag module 238 the may be configured to provide the user device 104 with the information content related to the identified object. The information content may include specifications, manufacturers, price, and the like for the identified object. Further, the information content may be a Uniform Resource Locator (URL) related to the product in the poster. In an implementation the information content may also be stored in the system data 240 as visual tag information 248. In another implementation, the information content, pertaining to the identified object, may be based on the event schedule of the event. For example, if the user enters an exhibition with a device such as the user device 104, and captures visual tag data related to a product that has been displayed, the event management system 102 may send information content related to the product, based on a schedule of the exhibition. Such a provision ensures that information content sent to the user device is correct and up to date, as same color coded tags may be used for different objects in different locations.

In an implementation the information content may be received by the viewer module 216. Referring to the previous example, when the user views the poster with the camera device of the user device 104, information content, like product for which the poster is displayed, brand of the product, price of the product, and the like may be displayed on the display of the user device 104 simultaneously with the ongoing capturing of the visual tag data.

Figure 3:
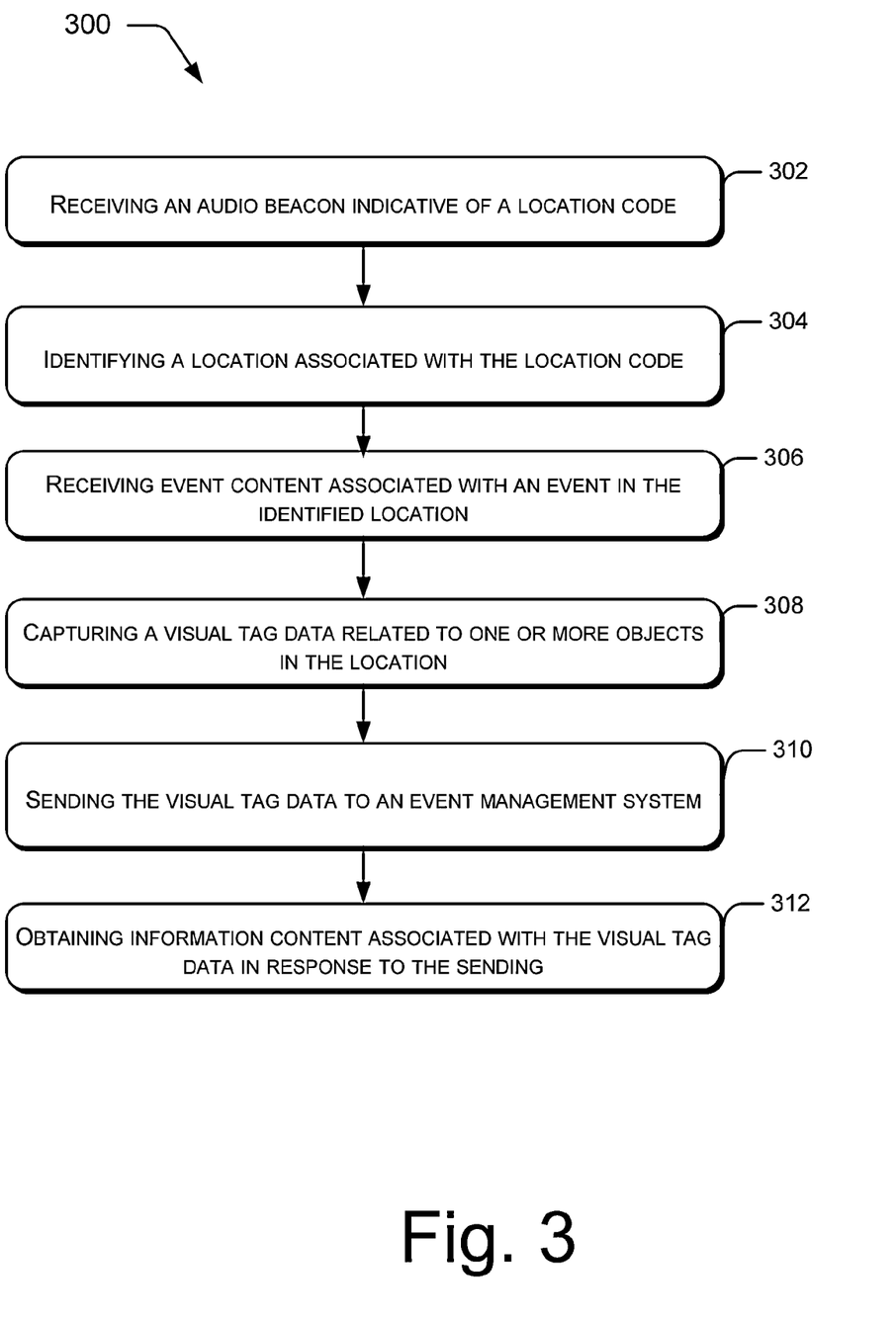
FIG. 3 illustrates a method for location based event identification, according to an implementation of the present subject matter.
Figure 4:
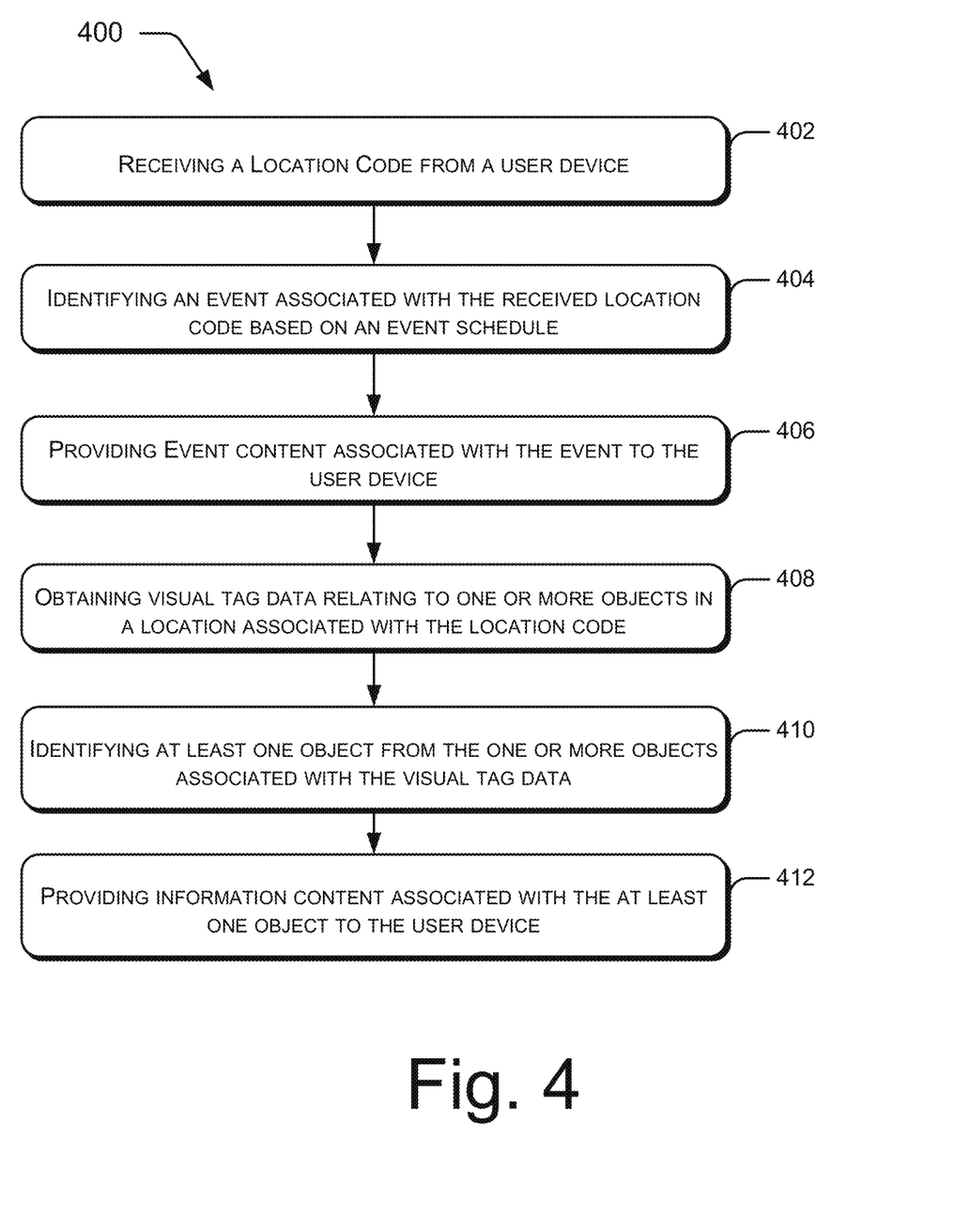
FIG. 4 illustrates a method for event management, according to an implementation of the present subject matter.

FIG. 3 illustrates a method 300 for location based event identification, in accordance with an implementation of the present subject matter. According to an aspect, the concepts of identifying an event are described with reference to the user device 104. Similarly, FIG. 4 illustrates a method 400 for event management, in accordance with an implementation of the present subject matter. According to an aspect, the concepts of event management are described with reference to the event management system 102.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the methods without departing from the spirit and scope of the subject matter described herein. Furthermore, the method can be implemented in any suitable hardware, software, firmware, or combination thereof.

Referring to FIG. 3, at the block 302, an audio beacon is received by the user device 104. In an implementation, the audio beacon may be received by the microphone module 210. The audio beacon may be received from a beacon device 108 that may be installed at a location in which an event is being held. As already described, the audio beacons may be understood as upper audio band signals that have encoded a location code associated to the location of the event. Further, the location code may be digitally encoded on the audio beacon. In an example, the location code may be decoded from the received audio beacon by the location code detection module 212.

At the block 304, the location associated with the location code is identified. In an embodiment, the location may be identified by comparing the location code with a plurality of location codes, each indicative of a predefined location, stored in a data repository. In another implementation, the data repository may be internal to the user device 104. In an embodiment, the location may be identified by communicating the location code to the event management system 102, through the network 106. After the location code is received by the event management system 102, the event management system 102 may identify the location associated with the location code. In an example, the event management system 102 may then identify an event based on the identified location and an event schedule associated with that location. To the identification of the event, event content relating to the identified event may be sent to the user device 104.

At the block 306, the event content relating to the event in the identified location is received from the event management system 102. The event content, for example, may be indicative the duration of the event, different sessions, name of the speakers, number of participants, and the like for the event held at the identified location. The event content may also include, for example, presentations, seminar reports, and the like of the event. In an implementation, the event content may be received in a user-defined format. Further, the user defined format may be based on a plurality of user preferences that may be configured in the event management system 102. The event content may be received by the event content module 214.

At the block 308, visual tag data relating to an object in the identified location is captured. In an implementation, the visual tag data may be captured by a camera device. The visual tag data may be indicative of color coded visual tags that may be embedded in the objects. For example, the visual tag data may be associated with the color coded visual tags embedded in a poster that is viewed by the user through the camera device or the visual tag data may be associated with the visual tags that may be embedded in a banner of a stall in the identified location. After capturing the visual tag data from the camera device, the method branches to block 310.

At the block 310, the captured visual tag data is sent to the event management system 102 over the network 106. In an implementation, the visual tag may be sent to the event management system 102 by the viewer module 216.

At the block 312, information content associated with the visual tag data is obtained. The information content, in an example, may correspond to information related to the object that has the color coded visual tags embedded, as described earlier. Referring to the previous example, if the visual tag data corresponds to the color coded visual tags embedded in a poster; the information content may include information relating to name of the product or the company for which the poster is displayed. In an implementation, the information content may be received by the viewer module 216 of the user device 104.

FIG. 4 illustrates a method 400 for identifying an event, in accordance with an implementation of the present subject matter.

Referring to FIG. 4, at block 402, the location code is received from the user device 104. As already described, the location code is associated with the audio beacon received by the user device 104. In an implementation, the location code may be indicative of the location of the user device 104. The location code may be received, in an implementation, by the location identification module 230. After the location code is received, the method branches to block 404.

At the block 404, an event associated with the received location code is identified. In an implementation, the location identification module 230 may determine the location associated with the location code. Further, the event detection module 232 may identify the event associated with the identified location. In an embodiment, the identification may be based on a present time and an event schedule as explained previously. The event schedule of the identified location may be configured in the event management system 102 and may be periodically updated as explained in the foregoing description. The event schedule updates may facilitate dynamic detection of the event by the user device 104.

At the block 406, the event content associated with the identified event may be provided to the user device 104. The event content, as previously described, may include event name, event duration, participant details, and the like for the event. Further, the event content may include presentations, memos, reports, and the like for the event. In an implementation, the event content may be provided, to the user device 104, by the event session module 236. After the event content is provided to the user device 104, the method branches to block 408.

At block 408, the visual tag data is obtained from the user device 104. In an implementation, the visual tag data may be obtained by the visual tag module 238. As already described, the visual tag data may correspond to one or more objects which may have color coded visual tags embedded such that the object may be identified on the basis of embedded color coded visual tags. In an example, the visual tag data may correspond to products, posters, banners displayed in the location of the event for which the user may seek additional information content to be displayed on the user device 104. After obtaining the visual tag data, the method branches to block 410.

At block 410, the object is identified based on the obtained visual tag data. In an implementation the object may be identified by the visual tag module 238. After the object is identified, the method branches to block 412.

At block 412, information content associated with the identified object may be sent to the user device 104. The information content, as already described, may include, name and specifications, manufacturers, designers, price and the like for the object. In one example, the information content may be a Universal Resource Locator (URL) associated with the identified object. In an implementation, the information content may be provided by the visual tag module 238 to the user device 104.

Although embodiments for methods and systems for event management have been described in a language specific to structural features and/or methods, it is to be understood that the invention is not necessarily limited to the specific features or methods described. Rather, the specific features and methods are disclosed as exemplary embodiments for event management.

We claim:

1. An event management system for location based event identification, the event management system comprising:
   a processor; and
   a memory coupled to the processor, the memory comprising,
      a location identification module configured to receive from a user device a location code decoded from an audio beacon, the audio beacon being received by the user device from a beacon device installed in a location where a plurality of events are scheduled to be organized, wherein the user device is present in the location;
      an event detection module configured to identify an event associated with the received location code based on an event schedule and a current time, the event schedule comprising information relating to the plurality of events scheduled to be organized in the location having the beacon device; and
      an event session module configured to provide, to the user device, event content associated with the identified event.

2. The event management system as claimed in claim 1, wherein the event session module is further configured to provide the event content associated with the identified event in a user defined format.

3. The event management system as claimed in claim 1, further comprising a scheduler module configured to:
   receive event schedule updates relating to the event associated with the received location code; and
   update the event schedule for the location associated with the location code based on the received event schedule updates.

4. The event management system as claimed in claim 1, further comprising a visual tag module configured to:
   obtain, from the user device, a visual tag data related to one or more objects in the location associated with the location code, wherein the visual tag data includes color coded visual tags embedded in the one or more objects for identification of the one or more objects in location having the beacon device;
   identify at least one object in the location from the obtained visual tag data based on a pre-stored data relating to a plurality of visual tag data associated with objects in location having the beacon device; and
   provide information content associated with the identified at least one object to the user device, wherein the information content is based on the event schedule of the event and wherein the information content includes specification of the at least one object, brand of the at least one object, and price of the at least one object.

5. A user device comprising:
   a microphone module configured to receive an audio beacon through a microphone device of the user device, wherein the audio beacon is indicative of a location code and wherein the audio beacon is received by the microphone device from a beacon device installed in a location where a plurality of events are scheduled to be organized;
   a location code detection module configured to determine a location associated with the location code decoded from the audio beacon; and
   an event content module configured to obtain event content associated with an event in the determined location, wherein the event is identified based on an event schedule and a current time, the event schedule including information relating to a plurality of events scheduled to be organized in location having the beacon device.

6. The user device as claimed in claim 5, further comprising a viewer module configured to:
   capture a visual tag data related to one or more objects in the determined location wherein the visual tag data includes color coded visual tags embedded in the one or more objects for identification of the one or more objects in the location having the beacon device; and
   obtain information content associated with at least one object based on the visual tag data from a pre-stored data relating to a plurality of visual tags associated with objects in the location having the beacon device, wherein the information content is based on the event schedule of the event and wherein the information content includes specification of the at least one object, brand of the at least one object, and price of the at least one object.

7. A method performed by a system for event management, the method comprising:
   receiving from a user device, a location code, wherein the location code is encoded in an audio beacon, wherein the audio beacon is received from a beacon device installed in a location where a plurality of events are scheduled to be organized;
   identifying an event associated with the received location code, wherein the identifying is based on a current time and an event schedule, the event schedule comprising information relating to the plurality of events scheduled to be organized in the location having the beacon device; and
   providing to the user device, event content associated with the identified event.

8. The method as claimed in claim 7, further comprising:
   obtaining visual tag data, wherein the visual tag data is related to one or more objects in a location associated with the location code, wherein the visual tag data includes color coded visual tags embedded in the one or more objects for identification of the one or more objects in the location having the beacon device;
   identifying at least one object from the visual tag data based on a pre-stored data relating to a plurality of visual tag data associated with objects in particular locations; and
   providing to the user device, information content associated with the identified at least one object, wherein the information content is based on the event schedule of the event and wherein the information content includes specification of the at least one object, brand of the at least one object, and price of the at least one object.

9. The method as claimed in claim 7, further comprising receiving event schedule updates relating to a location associated with the location code.

10. A method for location based identification of an event, the method comprising:

receiving location code decoded from an audio beacon, the audio beacon being received from a beacon device installed in a location where a plurality of events are scheduled to be organized;

identifying a location associated with the location code;

identifying an event associated with the identified location based on an event schedule and a current time, the event schedule including information relating to the plurality of events scheduled to be organized in the location having the beacon device; and receiving event content associated with the identified event in the identified location.

11. The method as claimed in claim 10, wherein the identifying of the location further comprises providing the location code to an event management system.

12. The method as claimed in claim 10, wherein the identifying of the location further comprises comparing the location code with a plurality of location codes stored in a data repository.

13. The method as claimed in claim 10, further comprising requesting the event content associated with the identified event from the event management system.

14. The method as claimed in claim 10, further comprising:

capturing a visual tag data related to one or more objects in the location associated with the location code, wherein the visual tag data includes color coded visual tags embedded in the one or more objects for identification of the one or more objects in the location having the beacon device;

sending the visual tag data to an event management system to identify at least one object from the obtained visual tag based on a pre-stored data relating to a plurality of visual tag data associated with objects in the location having the beacon device; and obtaining information content associated with the identified at least one object in the visual tag data, in response to the sending, wherein the information content is based on the event schedule of the event and wherein the information content includes specification of the at least one object, brand of the at least one object, and price of the at least one object.

15. A non-transitory computer-readable medium having embodied thereon a computer program for executing a method comprising:

receiving, from a user device, a location code, wherein the location code is decoded from an audio beacon, the audio beacon being sent to the user device from a beacon device installed in a location where a plurality of events are scheduled to be organized;

identifying an event associated with the received location code wherein, the identifying is based on a present time and an event schedule, the event schedule including information relating to the plurality of events scheduled to be organized in location having the beacon device; and providing, to the user device, event content associated with the identified event.

16. A non-transitory computer-readable medium having embodied thereon a computer program for executing a method comprising:

receiving an audio beacon indicative of a location code, the audio beacon being received from a beacon device installed in a location where a plurality of events are scheduled to be organized;

sending the location code to a server, wherein the location is decoded from the audio beacon;

identifying a location associated with the location code; and receiving event content associated with an event in the identified location based on a current time and an event schedule, wherein the event schedule includes information relating to the plurality of events scheduled to be organized in location having the beacon device.

* * * * *